June 21, 1927.  N. TRBOJEVICH  1,633,051
METHOD OF GENERATING GEARS
Filed Nov. 20, 1922   3 Sheets-Sheet 1

Inventor
Nikola Trbojevich

Attorneys

June 21, 1927. 1,633,051
N. TRBOJEVICH
METHOD OF GENERATING GEARS
Filed Nov. 20, 1922   3 Sheets-Sheet 2
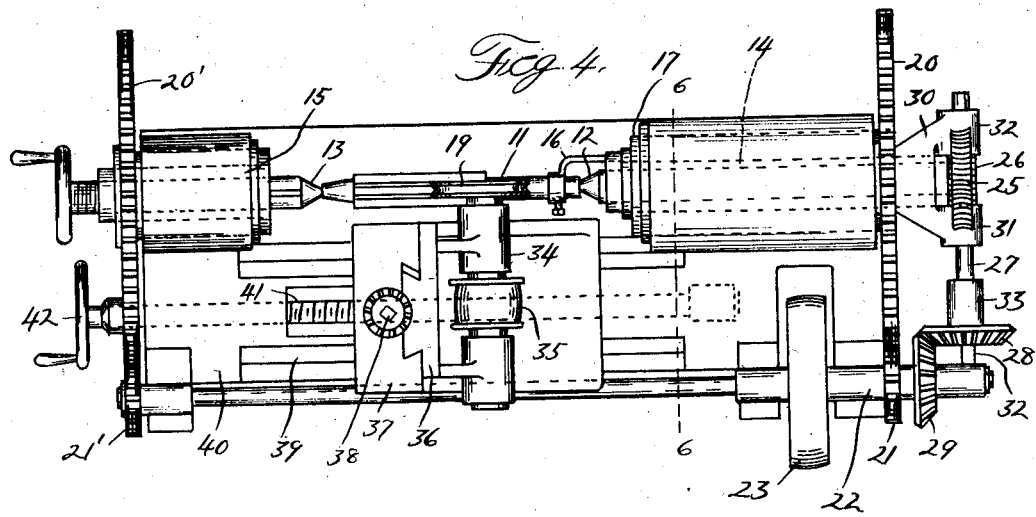
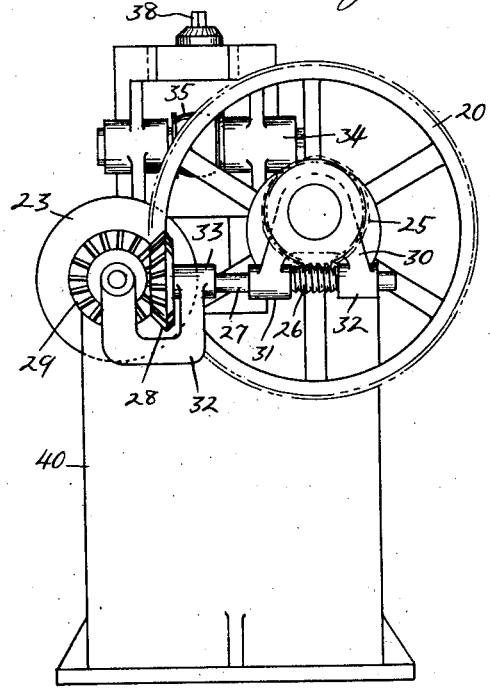
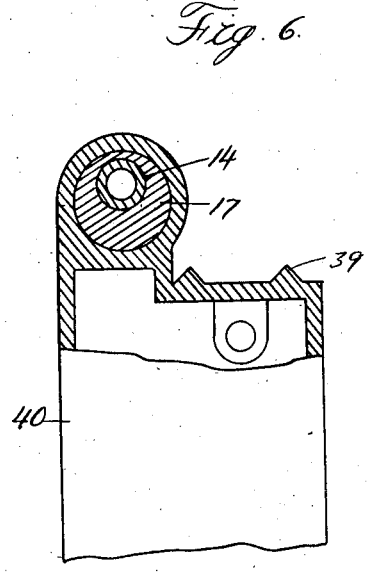
Inventor
Nikola Trbojevich
Attorneys June 21, 1927.

N. TRBOJEVICH 1,633,051

METHOD OF GENERATING GEARS

Filed Nov. 20, 1922

Inventor
Nikola Trbojevich

By Whittemore Hulbert Whittemore Belknap
Attorneys

Patented June 21, 1927.

1,633,051

UNITED STATES PATENT OFFICE.

NIKOLA TRBOJEVICH, OF DETROIT, MICHIGAN.

METHOD OF GENERATING GEARS.

Application filed November 20, 1922. Serial No. 602,036.

The invention relates to a method of generating gears, spline shafts and other similar members in which there are a number of equally spaced similar teeth or other sections in a continuous sequence around the periphery of the member. The method has a wide variety of applications such as the milling, shaping and grinding of spur gears, spline shafts, straight bevel gears and helical gears.

The gear cutting machines as known in the art may be divided into two classes, namely, those in which the tool and the gear blank are rotated in timed relation with each other and in which all teeth are generated in a continuous and uninterrupted sequence and those in which only one tooth is finished at a time and a separate apparatus is employed for indexing the blank in order to cut the required number of equi-spaced teeth. In the first class, the chief representative of which is the hobbing machine, there is a simple and continuous method of indexing but such machines require a tool of complicated design in order to properly generate the tooth form. In the second class the tool is usually of relatively simple design but the machine requires a separate indexing apparatus.

In my improved method the advantages of both classes are united as I may employ a tool of simple design and yet obtain continuous indexing. The method is especially valuable in the grinding of gears or spline shafts on account of the simplicity and the consequent accuracy of operation.

In the drawings:—

Figure 3:
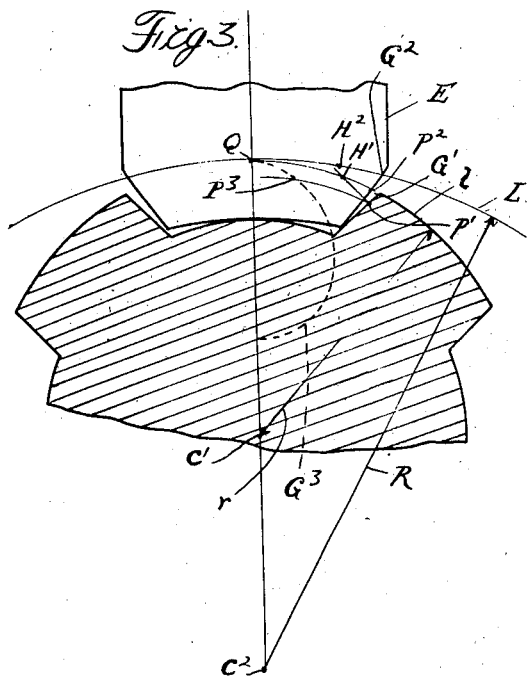
Figure 7:
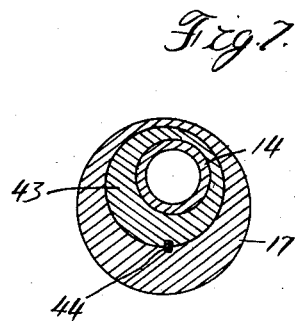
Figure 8:
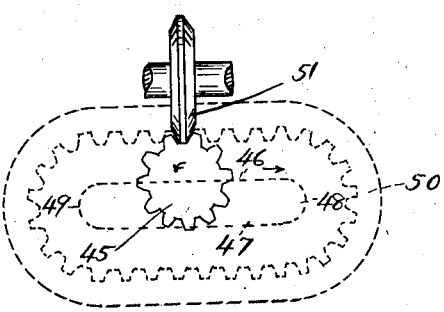
Figure 9:
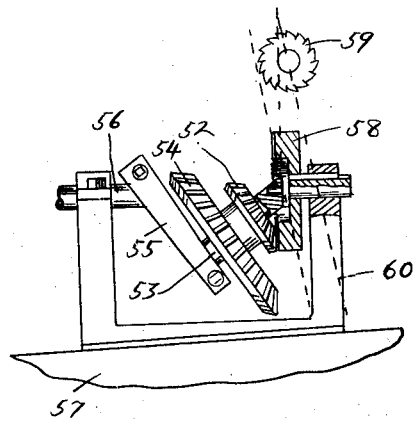
Figure 10:
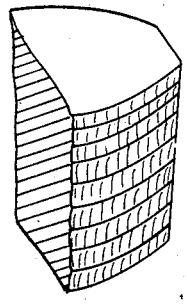
Figure 11:
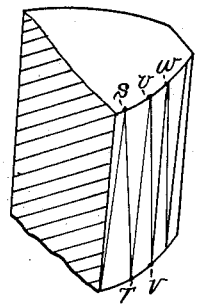

Figure 3 ilustrates the graphical method of determining the conjugate curve of the tool to develop a predetermined contour of the work;

Figure 4 is a plan view of a machine for generating surfaces according to my new method;

Figure 5 is an end elevation thereof;

Figure 6 is a transverse section on the line 6—6 of Figure 4;

Figure 7 is a transverse section similar to Figure 5 but modified to form a means for adjusting the center distances between the axes of rotation;

Figure 8 is a diagrammatic view illustrating the application of my method when the blank is moved through a non-circular orbit;

Figure 9 is an elevation of an apparatus for generating bevel gears according to my method;

Figure 10 shows a portion of a work piece which has been milled;

Figure 11 is a similar view of a work piece which has a shaped surface.

Figure 1:
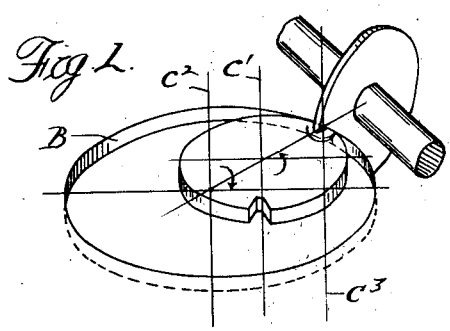
Figure 1 is a diagrammatic view illustrating the principle involved in my method.

The basic principle underlying my method is that the blank rotates simultaneously and continuously about two co-planar axes and that these rotations are exactly timed in a ratio of two relatively prime numbers, i. e. numbers containing no common divisors. In order to clearly understand this principle it is sufficient to consider its application to the cutting of cylindrical straight tooth elements, such as spur gears and spline shafts. As illustrated in Figure 1, a cylindrical blank A is rotated simultaneously about the axis $C'$ and about a second coplanar axis $C^2$ in opposite directions, as shown by the arrows. It is known from kinematics that these two rotations are equivalent to a single rotation about a third axis $C^3$, the position of which changes at every instant as the rotations about $C'$ and $C^2$ progress. It is always possible to select dimensions so, first, that the angular velocity about $C^2$ will be proportional to the number of teeth to be cut; second, that the angular velocity about $C'$ will be proportional to a whole number greater than the number of teeth to be cut and relatively prime to said number, and third, that the center distance between the axes $C'$ and $C^2$ will be such that the axis of instantaneous rotation $C^3$ will always touch the pitch surface of the gear. If these conditions are fulfilled the blank A will have a planetary motion the same as if it were in mesh with a stationary internal gear B, the latter having its center at $C^2$ and a pitch radius equal to the distance between $C^2$ and $C^3$. In other words, the rotation of the blank about two coplanar axes imparts both a rotational and an orbital movement to the blank.

Figure 2:
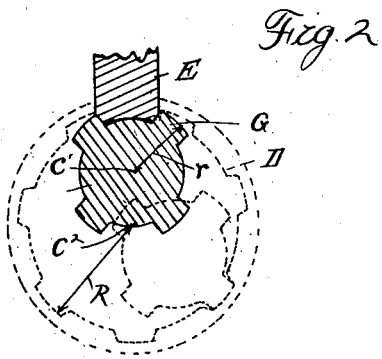
Figure 2 illustrates the principle of spacing by means of relatively prime members.

The principle of spacing by means of prime numbers will best be understood from Figure 2. The shaft F having four splines G is rotated about the coplanar axes $C'$ and $C^2$ in opposite directions. In order to generate the profile by this new method a whole number greater than four (the number of splines) and relatively prime thereto is selected, such as the numbers 5, 7, 9, 11 etc. If the selected number is 7 the major pitch radius R drawn from $C^2$ equals $7/4\ r$ (where small $r$ is the pitch radius from the center $C'$), and the center distance $C'$, $C^2$ is equal to $3/4\ r$. If the angular velocity about $C^2$ be equal to unity, clockwise, the angular velocity about $C'$ must be 7/4 counter clockwise. The blank F, therefore, moves as if it were in mesh with the imaginary stationary internal gear D having seven teeth corresponding with the splines G. The tool E which may be a formed rotary cutter, a rotary grinder or a shaping tool, is superposed upon one of the teeth of the imaginary internal gear D.

It will be seen that after every cycle of rotation about the major axis $C^2$ a tooth profile is generated in a rolling enveloping fashion by the tool E and furthermore that after every cycle another tooth of the shaft G is generated so that the operation will be exactly repeated only after four cycles about the axis $C^2$. The same movement of the blank is thus made to serve three purposes, namely, (1) it provides the necessary rolling of the blank over the tool to generate the profile; (2) turns the blank about its axis $C'$ a predetermined amount for the purpose of indexing, and (3) it draws the blank away from the tool in order that the teeth may not be mutilated by said tool during the process of indexing. These are all accomplished by using only two suitably selected rotations.

As the exact absolute path of every point of the profile to be generated is known, the conjugate curve of the tool E may be graphically determined by the following well known rules. Thus, assuming a point $P_1$ on the curve $G_1$ to be generated, as shown in Figure 3, the corresponding point $P_3$ on the line of action $G_3$ and the point $P_2$ on the generating curve $G_2$ may be found as follows: A normal $P_1\ H_1$ to the curve $G_1$ is erected at $P_1$ to intersect the pitch line 1 at the point $H_1$ and an arc $P_1\ P_3$ is drawn through $P_1$ using $C_1$ as the center. From the point Q, which is the point of tangency of the major and minor pitch lines L and 1 respectively, the distance $Q\ P_3$ is laid off equal to the distance $P_1\ H_1$, thus locating the point $P_3$. Now an arc $P_3\ P_2$ is drawn through the point $P_3$ using $C_2$ as a center. The arc $Q\ H_2$ is laid off on the pitch line L equal in length to the arc $Q\ H_1$ and the distance $H_2\ P_2$ is made equal to the distance $H_1\ P_1$, thereby locating the point $P_2$ on the required curve $G_2$. In the same manner any number of points $P_2$ may be plotted corresponding to points $P'$ of the curve $G'$ thus determining the curve $G_2$ to any degree of accuracy desired. If the curve $G_1$ be an involute of a circle, the conjugate curve $G_2$ will also be an involute although drawn from a different base circle.

The construction of a typical machine embodying my invention and adapted to grinding of spline shafts is shown in Figures 4, 5 and 6. The shaft to be ground 11 is held between two centers 12 and 13 which are mounted in the corresponding spindles 14 and 15. The shaft is positively driven by one of the spindles 14 through suitable means, such as the dog 16. The spindle 14 is rotatable in an eccentric bore in the main spindle 17 and the amount of eccentricity is predetermined according to the nature of the work to be performed, as shown in Figure 2. The spindles 14 and 17 are individually driven at different rates and in opposite directions, thereby imparting to the spline shaft 11 a planetary motion whereby it periodically engages a grinding wheel 19, the profile of which is exactly trimmed to form a conjugate curve, as shown in Figure 3. The trimming of the profile of the grinding wheel may best be accomplished by means of one or more accurately guided diamond points, similar to the arrangement used in the conventional form-grinding machines. Referring in particular to the conjugate curve determined by the successive loci of the point $P_2$ Fig. 3, it can be shown that said curve is a comparatively short segment of a trochoid of the general cardioid character having a considerable radius of curvature. This fact is of considerable practical importance as the short segment of that comparatively flat curve may be very closely approximated by a suitably selected circular arc. Thus, in practical application of this invention, sufficiently accurate splined shafts may be produced by a grinding wheel, the cutting profile of which is limited by three circular arcs only, viz—by a bottom radius struck from $C_2$ as a center, and by two symmetrical side arcs having their radii and centers so selected as to approximate the theoretical cardioid curve as closely as possible.

The main spindle 17 is positively rotated by means of gears 20 and 21 which are in turn driven by the shaft 22 having mounted thereon the pulley 23, which is suitably connected to a driving means (not shown). The shaft 22 also imparts motion to the tail spindle 13 by a similar train of gears 20' and 21'. In order to independently drive the spindle 14, this spindle is provided with a worm gear 25 which meshes with the worm 26 upon the shaft 27 and is driven by the bevel gears 28 and 29, the latter being keyed to the shaft 22.

Since the spindle 14 has an orbital movement with respect to the base of the machine, it is necessary to provide special means for holding the worm 26 in engagement with the worm wheel 25. As shown, this means consists of the U-shaped bracket 30 which is journaled upon the spindle 14 and contains the bearings 31 and 32 for engaging the shaft 27. For supporting the bevel gear 28 there is provided another U-shaped bracket 32 which is swiveled upon the main driving shaft 22 and contains a bearing 33 for receiving the shaft 27 and holding the gear 28 in engagement with the cooperating gear 29. In order to provide means for compensating for the change in center distances between the shaft 22 and the spindle 14 during the planetary movement of the latter, the shaft 27 is in splined engagement with the worm 26, thereby permitting a relative longitudinal movement.

The arrangement provided for driving the spindle 14 is not theoretically correct for imparting an absolutely constant rotation because of the oscillatory movement of the driving shaft 27, but since the work to be ground is in engagement with the grinding wheel 19 for only a small portion of the cycle of rotation of the work, the error introduced can be neglected for all practical purposes. The error is further minimized by arranging the driving mechanism as shown, so that the driving shaft 27 is at the low velocity portion of its oscillation about the shaft 22 when the grinding wheel is in engagement with the work.

The object of the tail stock is to support the work at the opposite end from the driving spindle while it is given the orbital movement but this is necessary only when the work is comparatively long, such as a spline shaft. For grinding gears, which have narrow faces, the tail stock may be entirely omitted and the work mounted directly on the primary spindle 14 by means of a suitable arbor and collars.

The grinding wheel 19 is mounted upon an arbor 34 which is driven by suitable means through the medium of the pulley 35. The arbor 34 is suitably journaled on the wheel head 36 which latter is vertically adjustable in the carriage 37 by means of the adjusting screw 38. The carriage 37 is slidably mounted on horizontal ways 39 of the base 40 and is longitudinally slidable thereon. The longitudinal feed of the carriage 37 is effected by means of the screw 41 which threadedly engages the carriage and the feeding may be accomplished either by the hand wheel 42 or by means of suitable gearing (not shown) from the shaft 22.

The ratio of rotation between the spindles 14 and 17 is such that for every revolution of the spindle 17 the spindle 14 turns on its own shaft $\frac{N}{n}$ times, where $n$ is the number of teeth to be cut and $N$ is a relatively prime number larger than $n$. If an automatic feed of the grinding wheel 19 is desired, the gear ratio may be chosen to give either a milling or a shaping effect to the contour of the work.

In the former method, the feed is arranged to continuously advance the carriage 37 from one end of the spline shaft 11 to the other and this feed is relatively small compared with the orbital movement of the work so that the grinding wheel advances only a short distance for each complete cycle of the work. The appearance of the finished work piece will be similar to that of hobbed gears, as illustrated in Figure 10.

On the other hand, the machine may also be adapted for forming a shaped surface and in this latter method the tool 19 reciprocates comparatively rapidly from one end of the work piece to the other, while the rotation about the two axes is relatively slow. The appearance of the work piece formed by the shaping process is illustrated in Figure 11, where the lines ST, UV etc. are finished on the downward strokes of the grinder, while lines TU, VW etc. are cut on the upward strokes.

My method is applicable for milling or shaping shafts instead of grinding them, as illustrated in Figures 4 to 6 and it is only necessary to replace the grinding wheel 11 with a suitable milling cutter or a shaping tool. I believe, however, that the utility of my method lies primarily in the field of gear and shaft grinding and when used for this purpose either the progressive and slow feed process may be used or the reciprocating process. Preferably the progressive feed method is used for long and slender work, such as spline shafts, while the reciprocating process will prove better suitable for work having a comparatively large diameter and short face.

In Figure 7 I have shown a modification of the arrangement of the spindles 14 and 17 by introducing an intermediate eccentric bushing 43 between the two spindles. This intermediate bushing is keyed to the main spindle 17 by means of the key 44 and the arrangement is such that by rotating the bushing 43 in its bearing, the center distance between the spindle 14 and the spindle 17 may be varied.

In Figure 8 I have illustrated the application of my method when the blank 45 describes a noncircular orbit. The orbit in this case consists of the straight portions 46 and 47 and the circular end portions 48 and 49. Assuming that it is desired to cut eleven (11) teeth in the blank 45 the imaginary internal gear 50 might have thirty (30) teeth, and in this case, where the orbit has a straight line portion or portions, the tool 51 could be formed with a rack profile which would generate an involute system or gear teeth upon the blank.

Figure 9 shows a simple apparatus suitable for generating bevel gears according to my method. The blank 52 is rotatably mounted on a stud 53 together with a master gear 54, said master gear having the same number of teeth or a multiple thereof which it is desired to cut upon the blank. The stud 53 is secured to an arm 55 which is clamped to the main arbor 56. The main arbor 56 is supported on a base 57, which base also supports a master crown gear 58 which is aligned with the arbor 56 and engages with the master bevel gear 54. The gear 58 has a relatively prime number of teeth with respect to the number of teeth to be cut and it will be seen that the principle of operation here is the same as that shown in Figure 2. The blank rotates simultaneously about two axes 53 and 56 which are coplanar and for every cycle about the major axis 56 it turns $\frac{N}{n}$ times about the axis 53 in the opposite direction. The orbit described by the face of the blank is a circular ring lying in the plane of the crown gear 58. The cutting tool 59 is located in this orbit and once in every cycle comes into rolling enveloping engagement with the blank. After every cycle another tooth of the blank 52 is finished because of the prime ratio and the process is exactly repeated only after $n$ cycles.

It will be seen, however, that if the cutting tool 59 is fed parallel to the plane of the crown gear 58 the teeth in the blank will not be cut wide enough at the outer circumference thereof but this defect may be eliminated by feeding the cutter 59 along the line 60 which is at an angle to the plane of the crown gear 61, whereby the tool will be fed deeper into the blank at the outer circumference than the inner circumference. The profile of the cutter 59 will be in the form of a rack tooth, as this form will generate an involute tooth on the blank as is well understood in the art. Thus by feeding the cutter deeper at the outer circumference of the gear it will also cut a wider slot between the teeth and in this manner the proper contour of the teeth in the bevel gear will be generated.

It will be seen from the preceding description that my method is adapted for cutting any kind of gears as long as they are of a circular cross section and have equi-spaced teeth. In order to generate helical teeth by my method the following two additional conditions must be fulfilled:—(1) The plane of the cutting tool must be tipped to coincide with the helical angle of the gear to avoid interference of the cutter with the sides of the helical teeth, and (2) an increment of rotation must be added to the blank to produce the required twist of the helix. The calculation of said increment is analogous to that used in the case of common hobbing machines and is based on the fact that for every inch of feed of the cutter along the face of the blank, the blank must either gain or lose $\frac{1}{L}$ revolutions, depending on the hand of helix, where L is the lead of helix.

My method is applicable not only for the generating of a series of equi-spaced teeth on a gear of circular cross section but in a broader aspect it may be used for indexing or dividing the circumference of a gear blank into equi-spaced segments. The indexing method is generic to the generating method since the generating method combines the continuous indexing with a cutting movement for forming the surfaces of the teeth. However, the indexing of a blank may be accomplished by substituting for the tool of the gear generating machine a cooperating member or index for laying off the equi-spaced segments on the periphery of the blank. The method may also be applied for the testing of gears to determine the degree of accuracy of the spacing of the teeth and this will be readily understood by referring to Figure 2. If the tool E is replaced by an indicating device of any of the well known types it will be seen that as the splines G progressively come into engagement with the indicating device, each spline will have the same relationship with the indicator as the previous one. Thus any inaccuracy in the spacing of the splines will be recorded upon the indicator.

What I claim as my invention is:—

1. The method of indexing or division of the circumference of a work piece into equi-spaced segments comprising the movement of the work in a closed orbit relative to a cooperating member located in predetermined relation with said orbit, and the simultaneous rotation of the work about an axis co-planar with the axis of said orbit in timed relation with said orbital movement, whereby said cooperating member once in every cycle, periodically engages a different portion of the circumference of the work.

2. The method of division of the circumference of a work piece into equi-spaced segments comprising the movement of the work in a closed orbit relative to a cooperating member in predetermiend relation with said orbit and the rotation of the work about an axis co-planar with the axis of said orbit, said orbital and rotational movements being timed in a ratio of two relatively prime numbers to cause an engagement of said cooperating member with progressive portions of said work piece once in every cycle.

3. The method of division of the circumference of a gear blank into equi-spaced segments comprising the movement of the blank in a circular orbit relative to a cooperating member located in predetermined relation with said orbit and the simultaneous rotation of the same about an axis co-planar with the axis of said orbit in the ratio of two relatively prime numbers with respect to the orbital movement to cause a periodic progressive engagement of said cooperating member with said gear blank once in every cycle.

4. The method of division of the circumference of a gear blank into equi-spaced segments comprising the imparting to the gear blank of a simultaneous rotational and orbital movement about co-planar axes relative to a cooperating member located on the outside of said orbit, said rotational and orbital movements being in the opposite directions and timed in the ratio of two relatively prime numbers whereby said cooperating member once in every cycle, periodically engages a different portion of the circumference of the work.

5. The method of division of the circumference of a cylindrical gear blank into equi-spaced segments comprising the movement of the blank in a closed orbit relative to a cooperating member and the simultaneous rotation of the same about an axis parallel to the axis of said orbit in the opposite direction from said orbital movement and timed with respect thereto in the ratio of two relatively prime numbers to cause a periodic engagement of said cooperating member with progressive portions of said blank.

6. The method of generating surfaces comprising the movement of the work in a closed orbit relative to a tool located in predetermined relation with said orbit and the simultaneous rotation of the work about an axis co-planar with the axis of said orbit and in timed relation with said orbital movement to cause a periodic rolling engagement of the tool with the work.

7. The method of generating surfaces comprising the movement of the work in a closed orbit relative to a tool located in predetermined relation with said orbit, and the simultaneous rotation of said work about an axis co-planar with the axis of said orbit in a ratio of two relatively prime numbers with respect to said orbital movement to cause a rolling enveloping engagement of said tool with said work once in every cycle of said orbital movement.

8. The method of generating gears comprising the movement of a blank in a circular orbit relative to a conjugate tool located in predetermined relation with said orbit, and the simultaneous rotation of said blank in the opposite direction about an axis co-planar with the axis of said orbit in a ratio of two relatively prime numbers with respect to said orbital movement to cause a rolling engagement of said conjugate tool with a tooth of said gear once in every cycle.

9. The method of generating gears comprising movement of a blank in a closed orbit relative to a tool having a cross sectional contour conjugate to the surface to be generated and the simultaneous rotation of the same in the opposite direction to said orbital movement about a co-planar axis in a ratio of two relatively prime numbers to cause a rolling engagement of said tool with a tooth of said gear once in every cycle of the orbital movement, the timing of said rotations allowing the engagement of said tool with the same tooth surface only after the completion of a great cycle consisting of a series of said orbital cycles equal to the number of teeth to be generated.

10. The method of generating surfaces which consists in imparting to the work a rotational and an orbital movement relative to a substantially conjugate tool located in predetermined relation with said orbit, said movements being about co-planar axes and timed in the ratio of two relatively prime numbers and the feeding of said tool transverse to the plane of rotation.

11. The method of grinding obstructed surfaces which consists in imparting to the work of rotational and an orbital movement relative to a rotatable grinder located in predetermined relation with said orbit, said movements being about co-planar axes and timed in the ratio of two relatively prime numbers, and said rotatable grinder having a cross sectional contour substantially conjugate to the surface to be generated, rotating said grinder about its axis and feeding said grinder transverse to the plane of rotation.

12. A method of grinding splined shafts and the like which consists in imparting to the work simultaneously two rotations, one about its axis and another about a parallel axis, relative to a rotatable grinder located at a predetermined portion of the orbit, said rotations being timed in the ratio of two relatively prime numbers, and said rotatable grinder having a cross sectional contour substantially conjugate to the surfaces to be generated, and feeding said grinder transverse to the plane of the orbit.

13. A method of grinding splined shafts or the like which consists in imparting to the work a planetary rotation with respect to a rotatable grinder wheel located at such a predetermined position in the planetary orbit as to be periodically engaged by said work, in providing said grinder with a profile substantially conjugate to the profile of said work, said profile being bound by three curves, and in imparting a movement of translation to said grinder wheel parallel to the axis of the work.

In testimony whereof I affix my signature.

NIKOLA TRBOJEVICH.